United States Patent [19]

Brown et al.

[11] Patent Number: 4,477,524

[45] Date of Patent: Oct. 16, 1984

[54] AQUEOUS SIZING COMPOSITION FOR GLASS FIBERS FOR USE ON CHOPPED GLASS FIBERS

[75] Inventors: Daniel G. Brown, Caroleen; Donald L. Motsinger, Forest City, both of N.C.

[73] Assignee: PPG Industries, Inc., Pittsburgh, Pa.

[21] Appl. No.: 422,126

[22] Filed: Sep. 23, 1982

Related U.S. Application Data

[62] Division of Ser. No. 268,541, May 29, 1981, Pat. No. 4,394,414.

[51] Int. Cl.³ .......................... B32B 9/00; B32B 25/20
[52] U.S. Cl. .................................. 428/391; 428/288; 428/290; 428/378; 428/392; 428/394
[58] Field of Search ................... 524/105, 211, 588; 428/288, 391, 392, 394; 65/3.41

[56] References Cited

U.S. PATENT DOCUMENTS

| | | | |
|---|---|---|---|
| 2,758,026 | 8/1956 | Landes et al. | 92/3 |
| 2,897,170 | 7/1959 | Gruber | 260/32.6 |
| 3,085,126 | 4/1963 | Labino | 136/146 |
| 3,215,585 | 11/1975 | Kneipple | 161/170 |
| 3,253,978 | 5/1966 | Bodendorf et al. | 162/152 |
| 3,395,071 | 7/1968 | Nitzsche et al. | 162/155 |
| 3,423,235 | 1/1969 | Campbell | 117/138.8 |
| 3,423,314 | 1/1969 | Campbell | 252/8.6 |
| 3,488,217 | 1/1970 | Ryan, Jr. | 117/138.8 |
| 3,493,425 | 2/1970 | Campbell | 117/138.8 |
| 3,556,754 | 1/1971 | Marsden et al. | 65/3 |
| 3,706,695 | 12/1972 | Huebner et al. | 117/226 |
| 3,749,638 | 7/1973 | Renaud et al. | 162/145 |
| 3,759,740 | 9/1973 | Campbell | 117/126 |
| 3,844,825 | 10/1974 | Tanahashi | 117/138.8 |
| 3,944,702 | 3/1976 | Clark | 428/288 |
| 3,979,253 | 9/1976 | Clark | 162/145 |
| 4,014,726 | 3/1977 | Fargo | 156/167 |
| 4,020,212 | 4/1977 | Erickson | 428/361 |
| 4,052,256 | 10/1977 | Renaud et al. | 162/145 |
| 4,052,257 | 10/1977 | Hill et al. | 162/156 |
| 4,105,567 | 8/1978 | Koerner et al. | 252/8.6 |
| 4,105,569 | 8/1978 | Crossfield | 252/8.6 |
| 4,118,272 | 10/1978 | Ziegler et al. | 162/156 |
| 4,178,203 | 12/1979 | Chakrabarti | 162/156 |
| 4,178,204 | 12/1979 | Chakrabarti | 162/156 |
| 4,178,206 | 12/1979 | Chakrabarti | 162/156 |
| 4,179,331 | 12/1979 | Chakrabarti | 162/156 |
| 4,183,782 | 1/1980 | Bondoc | 162/156 |
| 4,210,697 | 7/1980 | Adiletta | 428/272 |
| 4,259,190 | 3/1981 | Fahey | 428/378 |
| 4,271,229 | 6/1981 | Temple | 428/288 |
| 4,311,626 | 11/1982 | Ona et al. | 525/477 |

OTHER PUBLICATIONS

Copending Patent Application, "Aqueous Sizing Compositions for Glass Fibers for Use in Producing Mat," S.N. 268,542, filed 5/28/81.
Product Information, Information About Silicone Emulsions, Dow Corning Corporation.
Copending patent application Ser. No. 238,724, filed 2/27/81.

Primary Examiner—Theodore E. Pertilla
Attorney, Agent, or Firm—Kenneth J. Stachel

[57] ABSTRACT

An aqueous sizing composition having a cationic lubricant, amide compound, and cationic silicone polymer aqueous emulsion which is used to produce wet chopped sized glass fiber strands or which also has a film former to produce continuous glass fiber strands. The moisture content of the wet chopped glass fiber strands is controlled to within about 9 to about 20 weight percent. The sized wet chopped glass fiber strands have good flowability and when used to produce non-woven glass fiber strand mat, produces mat with good flexibility and tensile strength.

23 Claims, 1 Drawing Figure

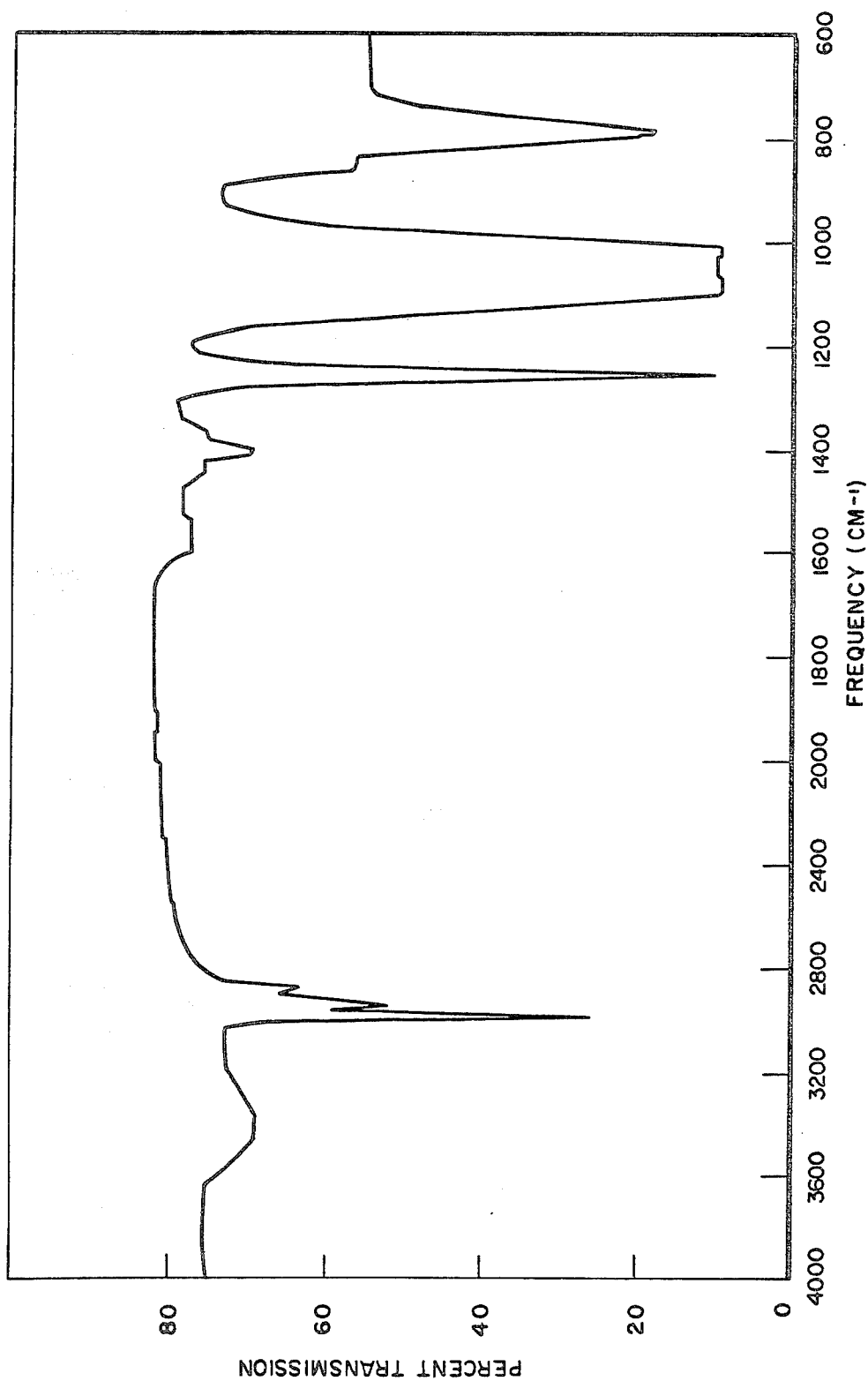

AQUEOUS SIZING COMPOSITION FOR GLASS FIBERS FOR USE ON CHOPPED GLASS FIBERS

This is a division of application Ser. No. 268,541, filed May 29, 1981 now U.S. Pat. No. 4,394,414.

The present invention is directed to an aqueous sizing composition for treating glass fibers and to a method for forming treated glass fibers and to the treated glass fibers and to mat of treated glass fibers, where the treated glass fibers have good flow characteristics for use in bulk handling systems, and where the treated glass fibers are to be used to produce a non-woven mat having good flexibility.

The production of glass fibers from molten glass involves attenuating fibers from small orifices in a bushing in a glass melting furnace. As the glass fibers are attenuated, but usually before they are gathered into one or more strands, an aqueous sizing composition is applied to them. The aqueous sizing composition is necessary to provide protection to the fibers from interfilament abrasion. Also, the sizing composition can be used to promote compatibility between the glass fibers and any matrix in which the glass fibers are to be used for reinforcement purposes. In the production of glass fibers, after the sizing is applied, the fibers can be gathered into one or more strands and wound into a package or chopped while wet and collected. The collected continuous strands or chopped strands can then be dried or the wet chopped strands can be packaged in their wet condition. Such steps depend upon the ultimate use of the glass fibers. The dried continuous glass fibers can be subsequently chopped or combined with other glass fiber strands to form a roving or produced into continuous strand mats or woven.

Increasingly, glass fibers are being used to produce a non-woven type of mat, where chopped fibers or chopped fiber strands are dispersed in an aqueous solution and formed into a paper-like mat product. An example of such a process is the "wet-laid process". Such a process involves forming an aqueous solution of chopped glass fibers or chopped glass fiber strands usually under agitation in a mixing tank, feeding the suspension through a moving screen to form the mat of glass fibers, while the water is separated from the fibers. Glass fibers by their nature are difficult to disperse in water to form a uniform dispersion. This difficulty is encountered initially, when the glass fibers are added to the water and complicated by the tendency of the glass fibers once scattered in the aqueous solution to reagglomerate to some degree. These reagglomerated fibers are then very difficult to redisperse.

Over the years, the art has dealt with this problem of the difficulty in dispersing glass fibers in an aqueous solution by several approaches. These approaches attempt to overcome the dispersion problem of glass fibers by controlling one or more of the factors believed to cause the problem. These factors include the length of the fibers, the electrical charges of the fibers, the diameter of the fibers, differing water absorption characteristics of the fibers, and the presence of sizing composition or finishes on the glass fibers. One earlier method was to maintain an acid pH in the aqueous solution to which the glass fibers were added, but such a system required more expensive processing equipment due to the acidic nature of the aqueous solution. More recent approaches involve using a particular sizing composition in conjunction with a particular dispersing system that is added to the aqueous solution to which the sized glass fibers are added. Another approach is to refine the dispersing system that is to be added to the aqueous solution to which the glass fibers are added independent of whether the glass fibers are sized or unsized.

The various approaches used in the art provide a non-woven glass fiber mat that has limited agglomeration areas of the glass fibers, thereby yielding a mat with good tear properties and tensile properties. Also, it has been suggested recently to have a post-treatment of the non-woven glass fiber strand mat to improve the wet tear properties of the mat, while it is being processed into a non-woven glass fiber strand mat.

A non-woven mat produced from these various approaches can be produced into paper with the use of proper binders for use as a mat for roofing materials and for backings for flooring materials and coverings for wallboard. Some of these uses require additional characteristics of a non-woven glass fiber strand mat than those characteristics available with the non-woven mats currently available. One such characteristic is the flexibility of the non-woven glass fiber strand mat. A non-woven glass fiber strand mat may be stored in various forms such as, in a roll for further use in paper making and the like. During the rolling and unrolling process, the mat must be flexible enough to withstand various forces without cracking. Such a characteristic would improve the processability and efficiency of the myriad products made with the mat.

Another characteristic that is sought not in the non-woven mat itself, but in chopped glass fiber strands and especially wet chopped strands used to make the mat or any other use to which chopped glass fiber strands are put is good flowability of the chopped strands. This good flowability is especially important when the chopped strands are to be handled by bulk handling machinery in producing glass fiber strand products such as non-woven mat or reinforced gypsum and cementitious products.

In addition, it would be advantageous to have a chopped glass fiber strand product that can be used in producing an aqueous solution for manufacture of a non-woven mat by a wet laid process, where the sizing composition on the chopped glass fiber strands does not inhibit dispersibility of the strands in water. It would be even more advantageous to have chopped sized glass fiber strands that are water dispersible without the use of dispersing aids since some of these dispersing aids are rather expensive.

It is an object of the present invention to provide an aqueous sizing composition for glass fibers that are manufactured by the wet chopped forming process to yield wet chopped glass fiber strands having good flowability especially in bulk handling machinery.

It is a further object of the present invention to provide wet chopped glass fiber strands that have good flowability in bulk handling machinery.

It is another further object of the present invention to provide an aqueous sizing composition for treating glass fibers in any forming process that allows for the production of non-woven glass fiber strand mat having good flexibility. It is another additional object of the present invention to provide a more flexible non-woven glass fiber strand mat.

It is a further additional object of the present invention to provide an aqueous sizing composition for treating glass fibers that produces chopped glass fiber strands having good dispersibility in aqueous solutions for forming non-woven glass fiber strand mat in a wet laid process with or without the use of dispersing aids.

It is another further object of the present invention to provide a process for producing flowable wet chopped glass fiber strand.

SUMMARY OF THE INVENTION

The aforementioned objects and other objects deducible from the following disclosure are provided by the aqueous sizing composition for treating glass fibers, the method of producing wet-chopped glass fiber strands, the sized glass fiber strands and non-woven mat formed from the treated chopped glass fiber strands of the present invention.

The aqueous sizing composition of the present invention has a major amount of the solids of the size comprised by one or more cationic lubricants and by one or more cationic, curable silicone polymers and has a minor amount of a water soluble or water dispersible amide having at least one hydrogen atom associated with the nitrogen atom. The aqueous sizing composition has an amount of water to give a total solids for the size in the range of about 0.1 to about 5 weight percent.

The method of producing flowable chopped glass fiber strands that are chopped during forming involves attenuating glass fibers from molten cones of glass from a bushing, sizing the glass fibers with an aqueous sizing composition to control the moisture content of the chopped glass fiber strands within the range of about 9 to about 20 weight percent, gathering the fibers into one or more strands and chopping the glass fiber strands to produce wet chopped glass fiber strands.

The treated glass fiber strands can be used to reinforce materials such as calcium sulfate dihydrate (gypsum) and other such calcium compound products such as cementitious products. Also, the treated glass fiber strands can be used to produce a non-woven glass fiber strand mat by any process similar to the "wet laid" process on any type of suitable machinery to produce a more flexible non-woven glass fiber strand mat.

BRIEF DESCRIPTION OF THE DRAWING

FIG. 1 is an infrared (IR) spectrum of the preferred cationic amino functional silicone polymer in an aqueous emulsion used in the aqueous sizing composition of the present invention.

DETAILED DESCRIPTION OF THE INVENTION

It is believed but the present invention is not limited by this belief that the good properties of flowability of the wet chopped glass fiber strands and the flexibility of the non-woven mat made from the treated glass strands are achieved because of the interactions of the chemical compounds comprising the non-aqueous materials of the sizing composition in the presence of the glass fibers. It is further believed, but not limiting the invention in any way, that these interactions between the chemical compounds in the aqueous sizing composition, when used with glass fibers as a sizing, produce treated glass fibers by the wet chopped forming process with a controlled moisture level. It is also believed, but not limiting in any fashion to the invention, that for the wet chopped glass fiber strands the controlled moisture level translates into the good flowability of the wet chopped glass fibers. This good flowability is especially evident when the wet chopped glass fiber strands are used in bulk handling apparatus. In addition, it is believed the interactions of the chemical compounds in the aqueous size and the glass, produce treated glass fiber strands which are capable of producing a non-woven glass fiber strand mat having good flexibility.

In accordance with the present invention, the flowability of the wet chopped glass fiber strand is achieved only when the chopped glass fibers have been produced by a wet chop glass fiber forming process. The production of a flexible mat of glass fiber strand is achieved by wet or dry chopped glass fiber strand produced by the present invention.

In the aqueous sizing composition a major amount of the solids (nonaqueous components) is comprised of a cationic lubricant and a cationic curable polysilicone. Any suitable cationic lubricant can be used and these are typically amine salts of a fatty acid having 4 to 26 carbon atoms and in most cases an even number of carbon atoms per molecule. A particularly suitable fatty acid moiety of the salt has between about 12 and 22 carbon atoms. The amines useful for forming the salt are tertiary amines of substantially low molecular weight, i.e., the alkyl groups attached to the nitrogen atom should have between 1 and 6 carbon atoms. Any suitable cationic lubricant can be used that imparts compatibility for the glass fibers and imparts slip to the exterior of the glass fibers. A particularly suitable cationic lubricant is the material available under the trade designation "Cation-X" which is an alkyl imidazoline reaction product of a tetraethylene pentamine and stearic acid. Acid solubilized water dispersible stearic amides and anhydrous acid solubilized water dispersible low molecular weight fatty acid amides as well as anydrous acid solubilized polyunsaturated low molecular weight fatty acid amides can also be used. Further examples of cationic lubricants include alkyl imidazoline derivatives such as described in U.S. Pat. Nos. 2,200,815; 2,267,965; 2,268,273; and 2,355,837 which are incorporated herein by reference and made a part hereof. The cationic lubricant is used in an amount from about 0.5 to about 3 percent by weight based on the aqueous sizing composition. The amount of cationic lubricant on a non-aqueous basis of the sizing composition is that amount which is effective for water compatibility of the glass fibers and for imparting slip to the exterior of the glass fibers. The amount of the cationic lubricant used in the aqueous sizing composition ranges from about 0.2 to about 3 weight percent. Of the non-aqueous or solids constituents in the sizing formulation, the cationic lubricant can range from about 20 to about 70 weight percent.

In addition to the cationic lubricant, the major portion of the non-aqueous components of the aqueous size is also comprised of an aqueous cationic, curable silicone polymer dispersion or emulsion. Any suitable cationic emulsion of a curable silicone polymer can be used.

The cationic emulsion is usually prepared from standard silicone polymer fluids, gums or resins, emulsifying agents, water and in some cases, finely divided solids which apparently act as carriers for the silicone.

Generally the water-in-oil dispersion is prepared first by passing a mixture of silicone fluid, gum or resin, one or more emulsifiers and/or surfactants, some water and solid dispersant, if used, through a high-shear blending device such as a colloid mill or homogenizer. The resulting paste is then dispersed in a larger amount of water with vigorous agitation. The final product is a silicone-in-water emulsion even though the silicone can be present in an amount up to 70 percent of the product.

The silicone emulsion generally has from about 5 to about 70 percent silicone and is usually diluted to a lower concentration before use. The emulsion is cationic in nature from the use of cationic emulsifiers and/or surfactants with the use of nonionic silicone fluid, gum, or resin and/or from the presence of a cationic and/or nonionic emulsifiers and/or surfactants and cationic silicone polymers. Any other suitable method for producing the cationic curable silicone emulsion known to those skilled in the art can be used.

Generally, the silicone polymer fluid, gum or resin can be room temperature curable, heat curable, free radical crosslinkably curable, and/or crosslinkably curable by reactive end groups such as silanols or curable by a combination of these methods. The silicone polymer can be homopolymer, copolymers, terpolymers or quadripolymers. The silicone fluid, gum or resin could also be a prepolymer that can be completely polymerized or cured by the use of a catalyst. The prepolymer is a silicone fluid, gum or resin in a state of partial polymerization or a state of incomplete polymerization.

The silicone polymers or prepolymers can have terminal groups such as:

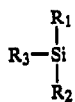

and a backbone structure such as

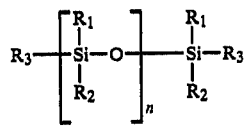

where:

$R_1$, $R_2$, $R_3$ are usually groups with 1 to 5 carbon atoms, hydrocarbon groups, hydrogen or alkoxy or hydroxy groups, and $n$ is a positive integer representing the number of units in the backbone structure. The silicone prepolymer will have a relatively low value for $n$, whereas "$n$" may also be high enough to give a molecular weight of around 10,000 to 100,000 or more such as for elastomeric silicones. Generally the silicone fluid is polydimethyl siloxanes but other silicone polymers or prepolymers such as polymethylethyl siloxane, polydiethyl siloxane, polydihexyl siloxane, polyphenyl siloxane, polydicyclopentyl siloxane, and methyl hydrogen polysiloxane and the like can be used.

A particularly suitable aqueous cationic emulsion is one having one or more cationic silicone polymers having silanol reactivity that is air curable. The emulsion will also have other materials normally used in the emulsion polymerization or formation process.

The cationic silicone polymer is usually formed by emulsion polymerization and can be any suitable silicone polymer having cationic functionality such as through the presence of amine groups, carboxylic groups, mercapto groups, acrylic or methacrylate groups.

One particularly suitable cationic functional silicone polymer is that available from Dow Corning under the trade designation "108 Emulsion". This material is a 35 percent amine functional silicone polymer that can be air dried or air cured. This polymer features both the silanol and organo functional reactivity and cures into an elastomeric silicone polymer. The silicone content is about 35 percent in the aqueous emulsion. The emulsion type is cationic and the pH is about 7.6 and its consistency is water thin. FIG. 1 shows an infrared spectagram of the emulsion 108 material.

An effective amount of the silicone polymer is that which gives water compatibility, flow control, and binder compatibility with the binder used in producing the non-woven glass fiber strand mat. The amount of the cationic silicone polymer emulsion used in the aqueous sizing composition is in the range of about 0.1 to about 1.0 weight percent of the aqueous sizing composition but higher amounts can be used although such a practice is not economically favorable due to the cost of the material. On a solids basis, this range of amounts is based on a 35 weight percent concentration of silicone in the sizing composition the amount of the cationic silicone polymer is in the range of about 6 to about 33 weight percent and once again, higher amounts can be present but such higher amounts would not achieve any more beneficial results and would be more costly.

As stated above, the amounts of the components of the aqueous sizing composition can range between various values, but in using these ranges, the cationic nature of the aqueous sizing composition must be maintained. Therefore, it is preferred to have a major amount of the cationic materials, that is, the cationic lubricant and the cationic silicone polymer aqueous emulsion with a minor amount of the amide compound.

The aqueous sizing composition also has present an amount of one or more amides, having at least one hydrogen associated with the nitrogen atom and having substantial water solubility and dispersibility. The amide may also have one or more amine groups, where the amine group is a primary or secondary amine. Any suitable amide, can be used that is substantially water soluble or water dispersible and that exists in the liquid or gas or dissolved in liquid or solid state and that provides moisture control for the sized glass fiber strands.

Non-exclusive examples of these amides include monoamides, diamides, amine-containing amides, carbamide and derivatives where the amide and amine groups are primary or secondary or mixtures thereof. Further examples include: urea, (carbamide), ethyl urea, 1,3-diethyl urea, 1,3-diaminourea, (carbohydrozide), methylurea, acetyleneurea, acetylenediurea, melamine, acetamide, propionic amide and the like to up to caproamide and carpylamide, diamides of saturated dicarboxylic acids such as oxamide, malonamide, propanediamide, succinamide, adipamide, heptanediamide, octanediamide, nonanediamide and sebacamide, and semicarbazide, carbohydrazide, carbamidourea, allophanamide (biuret) and 1-carbamoylsemicarbazide (biurea). Particularly suitable saturated amides are the solid diamides such as urea, melamine, diamide of saturated dicarboxylic acids and the like that are slightly hygroscopic and capable of forming an aqueous salt solution.

The amount of the amide compound used in the aqueous sizing composition is that which is effective for moisture control of the wet chopped glass fiber strand. The amount of the amide compound used in the aqueous sizing composition is equivalent to about 0.2 to about 2 weight percent of the aqueous size, when the amide has an activity equivalent to urea. More active amides can be used in smaller amounts and less active amides can be used in larger amounts. On a solids basis, the amount of the amide compound is in the range from about 20 to about 70 weight percent of the solids or the non-aqueous components of the size for equivalent activity to urea.

In addition to the foregoing components of the aqueous sizing composition, additional ingredients may be used. One such additional ingredient is a silane coupling agent which can be one or more of any suitable silane coupling agents known to those skilled in the art for use in sizing composition.

To use the aqueous sizing composition in a continuous glass fiber strand forming process, the size must also have a starch or polyvinylacetate film former. The amount of the starch film former is that typically used in aqueous sizing compositions for glass fibers. Once the continuous glass fiber strands are collected, they can be chopped or dried and chopped. The latter step produces a dry chopped glass fiber strand product. Generally, the solids content of the aqueous size is preferably in the range of about 0.5 to about 3 weight percent with a wet chop forming process. The solids content is concomitantly higher when the film former is used for continuous strand forming process or when additional ingredients are present. Any other ingredient commonly used in aqueous sizing compositions can also be used in the aqueous sizing composition of the present invention.

The aqueous sizing composition with at least the cationic lubricant, cationic curable silicone polymer emulsion and amide compound, is applied to the glass fibers in a wet chop forming process. Such a forming process involves supplying a plurality of streams of molten glass, attenuating the streams into filaments, applying an aqueous sizing composition to control the moisture of the resulting chopped glass fiber strands to a moisture level in the range of at least about 9 to about 20 weight percent of the chopped glass fiber strand, and cutting the continuous filaments into discrete segments. The glass fibers can be cut as individual fibers or they can be gathered into one or more strands and subsequently cut. The cut glass fibers or glass fiber strands then are collected as wet chopped glass fiber strands. Any other suitable wet chopped glass fiber forming process can be used when the aqueous sizing composition of the present invention is applied to the glass fibers. The control of the moisture content between the range of at least 9 and 20 and preferably 9 to 15 weight percent is crucial for the flowability of the wet chopped glass fiber strands. It is believed, without limiting the invention, that it is the moisture content and the uniformity of the moisture content that enables the wet chopped glass fiber strands to have good flowability properties.

The amount of the aqueous sizing on the wet chopped glass fiber strands varies from about 0.01 to about 0.5 percent LOI. The percent LOI will be higher when a starch film former is present. The wet chopped glass fiber strands can be chopped into any length and the diameters of the glass fibers can be any diameter from the microsized glass fibers to the coarser diameter glass fibers even including coarse glass fiber strands having a diameter of around 27 microns. On average, a better result is obtained with the aqueous sizing composition of the present invention on the coarser glass fiber strands ranging in diameter from about 3 to about 27 microns.

The wet chopped glass fiber strands can be used in bulk handling apparatus for mixture with various matrices. An example of such a matrix is gypsum. In addition, the wet chopped glass fiber strands can be used in producing non-woven glass fiber strand mat. There is no absolute fiber length for a given glass fiber diameter in the production of non-woven glass fiber strand mat but generally the half-inch chopped strands having a diameter of around 16 microns can be used. As the lengths increase, the fiber diameters can also increase and mixtures of various lengths and various diameter glass fiber strands can be used. The wet chopped glass fiber strands in any suitable length and diameter can be used for producing non-woven glass fiber strand mat. This invention can be carried out by employing any glass fibers conventionally employed to form glass mats. Preferably, the glass fibers will have a diameter within the range of about 3 to 27 microns and will have a length of about ¼ inch to 3 inches.

The wet chopped glass fiber strands can be formed into a non-woven glass fiber strand mat by any suitable process known to those skilled in the art. One example is the wet-laid process which involves, first, forming an aqueous suspension of short-length glass fibers under agitation in a mixing tank and, second, feeding the suspension through a moving screen on which the fibers enmesh themselves while the water is separated thereform. The amount of chopped glass fiber strands added to the water can be in the range of about 0.5 to about 1 weight percent of the aqueous solution. The wet chopped sized glass fibers of the present invention can be used in conjunction with conventional paper making apparatus such as the inclined wire, the rotoformer or the fourdrinier machines. The wet chopped glass fiber strands of the present invention can be used with or without dispersing aids to form a dispersion of glass fiber strands in an aqueous suspension for use in the wet-laid process or other paper making processes and machines. Although the sized glass fibers of the present invention can be used without dispersion aids, any of the conventional dispersing aids can be used along with the chopped sized glass fiber strands of the present invention. Examples of dispersing aids that can be used include the polyoxyethylated tallow amine dispersing agents available from GAF Corporation under the trade designation "Katapol" materials used alone or in conjunction with hydroxyethyl or hydroxymethyl cellulose such as that available from Hercules Inc., under the trade designation "Natrasol". Another example of a dispersing agent that can be used with the chopped glass fiber strands of the present invention is the dispersing agent available from Diamond-Shamrock Chemical Company under the trade designation "Nopcosperse" and especially the "Nopcosperse FFD" product. The Nopcosperse FFD product is a blend of alkyl sulfate quaternary of an alkyl amino fatty acid amine or amide in a water dispersible, liquid mineral oil with an inorganic silica defoaming agent. Another example of dispersing agents that can be used include quaternary ammonium compounds such as those available under the trade name "Arquad 2HT-75" and the like. Also quaternary ammonium surfactants can be used such as those available under the "Arquad" and "Aliquat" trade designations and mixtures of amine oxides with derivatized guar gum and mixtures of guar gum and isostearic amide.

Any suitable binder known to those skilled in the art may be used with the non-woven glass fiber strand mat to form a paper like mat. The typical binder used is a urea formaldehyde resin and chemically modified urea formaldehyde resins having anionic or cationic characteristics.

PREFERRED EMBODIMENT

Although the aqueous sizing composition can have any particular type of the aforelisted components in any amount in the aforelisted ranges and mixed by any suitable process known to those skilled in the art, the aqueous sizing composition has a preferred formulation and a preferred process for mixing. The preferred formulation is as follows:

| Ingredients | 120 gallons (454.2 liters) | |
|---|---|---|
| Cold Water | 208 liters | |
| Hot Water (40° C.) | 18.9 liters | |
| Cationic lubricant (Cation-X) 33–39 percent solids | 2529.7 grams | 0.56 weight percent |
| Hot Water | 18.9 liters | |
| Urea (100% solids) | 2404 grams | 0.53 weight percent |
| Cationic silicone polymer emulsion (Dow Corning emulsion 108) | 865.4 grams | 0.19 weight percent |

It is preferred when mixing the aforementioned materials that the water used is deionized water. The mix solids for the aqueous sizing composition is preferably in the range of about 1.10±0.20 percent. The pH of the aqueous sizing composition is preferably 5.9±0.5.

The aqueous sizing composition is prepared by first adding the initial cold deionized water to the main mix tank. Second, the Cation-x lubricant is added to 5 gallons of hot water (40° C.) in a suitable premix vessel and agitated until dissolved and then added to the main mix tank with continued agitation. The urea is then dissolved in 18.9 (5 gallons of hot (40° C.) water) in a suitable premix tank and agitated until dissolved and then added to the main mix tank with continued agitation. Next, the preweighed quantity of Dow Corning Emulsion 108 cationic silicone emulsion is added directly to the main mix tank with continued agitation. The aqueous sizing composition is then diluted to the final desired volume with cold deionized water and agitated for around 15 minutes.

The aqueous sizing composition is applied to the glass fibers formed by the wet chopped glass fiber forming process.

The sized wet chopped glass fiber strands are preferably used in bulk handling machinery in the manufacture of paper-like, non-woven, glass fiber strand mat. In manufacturing the non-woven glass fiber strand mat, it is preferred to use a dispersing system and the preferred dispersing system is a blend of polyoxyethylated (5) tallow amine available from GAF Corporation under the trade designation "Katapol" in combination with a hydroxymethyl cellulose available as Natrasol 250 HR. In an alternative embodiment, the dispersion system can be a blend of the Natrasol 250 HR with Nopcosperse FFD dispersion aid available from Diamond-Shamrock Corporation. These dispersion aids are used in suitable amounts known by those skilled in the art. The wet chopped glass fiber strands are added to an aqueous solution along with the dispersion system with agitation to produce an aqueous solution of dispersed glass fiber strands, which is then further manufactured by the wet-laid process and combined with a binder to produce the non-woven glass fiber strand mat.

The preferred embodiments and other embodiments will be further illustrated by the following examples.

EXAMPLE I

Using the method of preparation described in the preferred embodiment, an aqueous sizing composition was prepared having the formulation shown in the preferred embodiment.

This aqueous sizing composition was used to treat M-5 glass fiber strand (filament diameter of around 16 microns) in a wet chop forming process. The glass fiber strands having moisture content of 14±2 percent and an LOI of 0.10 percent ±0.05 percent. The chopped strands were 2 inch in length ±1/16 of an inch. A nonwoven glass fiber strand mat was prepared from these chopped glass fiber strands by the wet-laid process using several urea formaldehyde binders.

EXAMPLE II

An aqueous sizing composition was prepared in the same manner as in Example I having the following formulation:

| Cation-X cationic lubricant | 640 grams | 0.59 weight percent |
|---|---|---|
| Urea | 200 grams | 0.51 weight percent of the aqueous sizing composition |
| Cationic silicone polymer emulsion (Emulsion 108) | 200 grams | 0.17 weight percent of the aqueous sizing composition |

Total volume of the aqueous size was 37.85 liters. The solids of the aqueous sizing composition was 1.21 weight percent at a pH of 5.6.

The aqueous sizing composition was used to treat in a wet chop glass fiber forming process M-5 glass fibers that were chopped into one-half inch ±1/16 inch lengths where the glass fibers have an LOI of 0.14 percent and a moisture content of 11 percent.

EXAMPLE III

An aqueous sizing composition was prepared by using the process described in the preferred embodiment (the aqueous sizing composition had the following formulation for 37.85 liters):

| Cation-X cationic lubricant | 1920 grams | 1.69 weight percent |
|---|---|---|
| Urea | 600 grams | 1.46 weight percent |
| Cationic silicone polymer emulsion (DC 108) | 600 grams | 0.5 weight percent |

This aqueous sizing composition had a percent solids of 2.16, a specific gravity of 1.005 and a pH of 5.6. This aqueous sizing composition was used to treat M-5 glass fiber strands in a wet chopped glass fiber forming process. The chopped glass fiber strands had a length of ½±1/16 of an inch and a LOI of 0.24 percent and a moisture content of 13.1 percent.

EXAMPLE IV

An aqueous sizing composition was prepared by the process depicted in the preferred embodiment wherein the aqueous sizing had the following formulation:

| Vinyl tris (2-methoxyethoxy silane) A172 available from Union Carbide | 50 grams | 0.13 weight percent |
|---|---|---|
| Cation-X cationic lubricant | 640 grams | 0.59 weight percent |
| Urea | 200 grams | 0.51 weight percent |
| Cationic silicone polymer | 200 grams | 0.18 weight percent |

-continued (DC 108)

The aqueous sizing composition had a percent solids of 1.18 with a specific gravity of 1.014 and a pH of 6.1. This aqueous sizing composition was used to treat M-5 glass fiber strands formed by the wet chopped glass fiber strand forming process. The chopped glass fiber strands had a length of a half an inch and an LOI of 0.05 and a moisture content of 13 percent.

Two other examples were conducted where the only difference was the type of silane used in the formulation. In one other example, the sample used was a lubricant modified gamma amino propyltriethoxy silane available from Union Carbide Corporation under the trade designation Y-9072. In another example the silane material used was a gamma glycidoxypropyl trimethoxy silane available from Union Carbide under the trade designation A-187. In general, Examples II through VI produced chopped glass fiber strands that have increased amounts of fuzz over the chopped glass fiber strands produced according to Example I.

An aqueous dispersion of the chopped glass fiber strands produced by Example I was prepared using two dispersion systems. The first dispersion system was the Katapol material blended with the Natrasol 250 HR material. The second dispersion system was the Nopcosperse FFD in combination with the Natrasol 250 HR thickening material. The non-woven mat was produced by the wet-laid process with the use of several urea formaldehyde binders. The tensile strength of the mat was tested against a non-woven glass fiber strand mat produced with a commerically available chopped glass fiber strand manufactured by Owens-Corning Fiberglas Corporation. The results of this testing are given in Table I.

The urea formaldehyde resins used are those available from Pacific Resins and Chemical Inc. under the trade designation 3958.

TABLE I

| Non-Woven Mat Made of Example Glass Fibers | Mat Wt. | LOI % | Disp. Chem. | Disp. Rating | Tensile Strengths,[1] MD 3"[2] lb./in. | | | | | Tear[5] (grams) | Taber[6] (units) | Flexibility by MIT cycles[7] |
|---|---|---|---|---|---|---|---|---|---|---|---|---|
| | | | | | Dry | Cold Wet | cw/d[3] | Hot Wet | hw/d[4] | | | |
| Commercial | 1.81# | 19.7 | 250HR KAT | Good | 95.5 | 88.5 | 0.93 | 35.7 | 0.37 | 335 | 44 | 24 |
| Ex. 1 | 2.02# | 17.7 | 250HR KAT | Good | 75.5 | 58.5 | 0.77 | 4.2 | 0.06 | 544 | 45 | 70 |
| Ex. 1 | 2.00# | 16.1 | 250HR FFD | Good | 59.0 | 45.2 | 0.77 | 5.0 | 0.08 | 535 | 34 | 49 |
| Ex. 1 | 1.94# | 20.0 | 250HR KAT | Good | 79.3 | 50.0 | 0.63 | 2.2 | 0.03 | 541 | 59 | 56 |
| Ex. 1 | 2.38# | 17.1 | 250HR KAT | Good | 116.2 | 100.2 | 0.86 | 32.7 | 0.28 | 547 | 78 | 19 |
| Ex. 1 | 2.01# | 11.7 | 250HR KAT | Good | 104.2 | 75.7 | 0.73 | 23.0 | 0.22 | 391 | 52 | 27 |
| Ex. 1 | 2.22# | 14.6 | 250HR KAT | Good | 114.0 | 107.0 | 0.94 | 32.0 | 0.28 | 373 | 94 | 19 |
| Ex. 1 | 1.98# | 19.8 | 250HR FFD | Fair+ | 86.2 | 60.5 | 0.70 | 3.0 | 0.03 | 617 | 63 | 51 |
| Ex. 1 | 2.09# | 17.4 | 250HR FFD | Fair | 99.2 | 92.7 | 0.93 | 23.7 | 0.24 | 413 | 56 | 14 |
| Ex. 1 | 1.90# | 15.7 | 250HR KAT | Good | 44.0 | 35.5 | 0.81 | 2.7 | 0.06 | 583 | 33 | 54 |
| Ex. 1 | 1.96# | 17.6 | 250HR FFD | Fair+ | 70.5 | 54.2 | 0.77 | 4.0 | 0.06 | 520 | 38 | 36 |

[1] Tensile strength was measured on Instron Machine with 3" span moving at 0.5 in./min.
[2] MD-3" refers to tensile strength in the machine direction for a "3 × 3" square specimen.
[3] cw/d refers to cold wet retained.
[4] hw/d refers to hot wet retained.
[5] Tear strength measured by standard Elmendorf Tearing Test at (1600 grams).
[6] Taber test for flexibility at 15° bending angle with 100 units as the highest obtainable unit.
[7] MIT tests cycles to break in a standard MIT testing machine with 0.03 inch jaw with 0.5 Kg tension.

Table II presents data showing the performance of the wet chopped glass fiber strands produced in accordance with the preferred embodiment and Example I in different resin systems for producing non-woven glass fiber strand mat. The mat with the chopped glass fiber strands of Example I is compared to a mat produced with commercial chopped glass fiber strands from Owens-Corning Fiberglas Corporation. II gives the estimated tensile strength of the two materials relative to each other.

TABLE II

| Binder Resin Urea Formaldehyde Resins Commercial Designations from Pacific Resins & Chemicals, Inc. | Mat of Glass Fibers | Dispersion System | Average Tensile Strength lb./in. |
|---|---|---|---|
| 3958D | Commercial | Nopcosperse FFD/Natrasol 250HR | 29.04 |
| | Example 1 | " | 17.21 |
| 3958E | Commercial | " | 22.62 |
| | Example 1 | " | 22.85 |
| 3958F | Commercial | " | 29.52 |
| | Example 1 | " | 38.43 |

TABLE II-continued

| Binder Resin Urea Formaldehyde Resins Commercial Designations from Pacific Resins & Chemicals, Inc. | Mat of Glass Fibers | Dispersion System | Average Tensile Strength lb./in. |
|---|---|---|---|
| 3958G | Commercial | " | 24.59 |
|  | Example 1 | " | 20.82 |
| 3958D | Commercial | Katapol/Natrasol 250HR | 26.38 |
|  | Example 1 | " | 12.78 |
| 3958E | Commercial | " | 25.34 |
|  | Example 1e | " | 20.95 |
| 3958F | Commercial | " | 29.79 |
|  | Example 1 | " | 24.83 |
| 3958G | Commercial | " | 23.81 |
|  | Example 1 | " | 11.28 |

D - is a neutral urea formaldehyde resin.
E - is a cationic urea formaldehyde resin (chemically modified to be cationic).
F - is an anionic urea formaldehyde resin (chemically modified to be anionic).
G - is a neutral urea formaldehyde resin.

The good flowability properties of the wet chopped glass fiber strands of Examples I through VI were observed visually.

The foregoing has described an aqueous sizing composition for producing sized glass fiber strands and a wet chopped glass ffiber strand forming process in which the size may be used. The wet chopped glass fiber strands produced have good flowability and when used to produce non-woven glass fiber strand mat gives a mat having good tensile strength and flexibility.

The aqueous sizing composition has a cationic lubricant, an amide compound and a cation silicone polymer aqueous emulsion. In the wet chop process the moisture content of the wet chopped glass fiber strands is controlled with the use of an aqueous sizing composition limiting the moisture content of the chopped glass fiber strand to at least 9 to about 20 weight percent to give good flowability.

We claim:

1. Wet chopped glass fiber strand produced by attenuating glass fibers from molten cones of glass from a bushing, sizing the glass fibers with an aqueous sizing composition, gathering the fibers into one or more strands and chopping the glass fiber strands to produce wet chopped glass fiber strands, THE IMPROVEMENT COMPRISING:
   a. sizing the glass fibers with an aqueous sizing composition having at least a cationic lubricant, cationic curable silicon polymer emulsion and amide compound that is water soluble or dispersible to control the moisture content of the wet chopped glass fiber strands in the range of at least about 9 to about 20 weight percent.

2. Chopped glass fiber strand formed by the wet chopped glass fiber forming process having an aqueous sizing composition for glass fibers, comprising:
   a. one or more cationic lubricants,
   b. water soluble or dispersible amide compound selected from the group consisting of monoamides, diamides, melamine, diamides of saturated dicarboxylic acids, carbamides, nonpolymeric amine-containing amides and mixtures thereof,
   c. curable silicone polymer in a cationic aqueous emulsion, and
   d. water in an amount to give a solids content in the range of about 0.1 to about 5 weight percent, wherein the major amount of the solids of the sizing composition is comprised of cationic lubricant and silicone emulsion.

3. Glass fiber strand of claim 2, wherein the cationic, curable, silicone polymer emulsion has the infrared spectrum of FIG. 1.

4. Glass fiber strand of claim 2, wherein the cationic lubricant is present in an amount in the range of about 0.2 to 3 weight percent.

5. Glass fiber strand of claim 2, wherein the water soluble or dispersible amide compound is present in an amount in the range of about 0.2 to 2 weight percent.

6. Glass fiber strand of claim 2, wherein the cationic, curable silicone polymer aqueous emulsion is present in an amount in the range of about 0.1 to about 1 weight percent.

7. Glass fiber strand of claim 2, wherein the cationic lubricant is an alkyl imidazoline reaction product of a tetraethylene pentamine and stearic acid.

8. Glass fiber strand of claim 2, wherein the water soluble or dispersible amide compound is urea.

9. Glass fiber strand of claim 2, wherein the cationic curable silicone polymer in aqueous emulsion is an amine functional silicone polymer in an aqueous emulsion.

10. Glass fiber strand of claim 2, wherein the moisture content of the wet chopped glass fiber strand is in the range of at least about 9 to about 20 weight percent.

11. Wet chopped glass fiber strand of claim 2, wherein the moisture content of the wet chopped glass fiber strand is in the range of at least about 9 to about 15 weight percent.

12. Glass fiber strand of claim 2, wherein the amount of the aqueous sizing composition present on the glass fiber strand is in the range of about 0.1 to about 0.5 percent LOI.

13. Glass fiber strand of claim 2, wherein the cationic, curable silicone polymer has carboxyl groups.

14. Glass fiber strand of claim 2, wherein the cationic curable silicone polymer has mercapto groups.

15. Glass fiber strand of claim 2, wherein the cationic, curable silicone polymer has acrylate or methacrylate groups.

16. Glass fiber strand of claim 2, which has present one or more silane coupling agents.

17. Glass fiber strand of claim 2, wherein the one or more silane coupling agents are selected from the group consisting of vinyl tris(2-methoxy silane), lubricant modified gamma-aminopropyltriethoxy silane, and gamma-glycidoxypropyltrimethoxy silane.

18. Continuous glass fiber strands having an aqueous sizing composition comprising:
   a. film former selected from the group consisting of starch and polyvinyl acetate,
   b. one or more cationic lubricants,
   c. water soluble or dispersible amide compound selected from the group consisting of monoamides, diamides, melamine, diamides of saturated dicarboxylic acids, carbamides, non-polymeric amine-containing amides and mixtures thereof,
   d. curable silicone polymer in a cationic aqueous emulsion, and
   e. water in an amount to give a solids content in the range of about 0.1 to about 5 weight percent, wherein the major amount of the solids of the sizing composition is comprised of the cationic lubricant and silicone emulsion.

19. Glass fiber strand of claim 18, wherein the cationic lubricant is present in an amount in the range of about 0.2 to 3 weight percent.

20. Glass fiber strand of claim 18, wherein the water soluble or dispersible amide compound is present in an amount in the range of about 0.2 to 2 weight percent.

21. Glass fiber strand of claim 18, wherein the cationic, curable silicone polymer aqueous emulsion is present in an amount in the range of about 0.1 to about 1 weight percent.

22. Glass fiber strand of claim 18, wherein the water soluble or dispersible amide compound is urea.

23. Glass fiber strand of claim 18, wherein the moisture content of the wet chopped glass fiber strand is in the range of at least about 9 to about 20 weight percent.

* * * * *